United States Patent [19]

Marubashi

[11] Patent Number: 4,623,869

[45] Date of Patent: Nov. 18, 1986

[54] ELEVATOR DISPLAY SYSTEM WITH OPTICAL POWER TRANSMISSION

[75] Inventor: Akira Marubashi, Inazawa, Japan

[73] Assignee: Mitsubishi Denki Kabushiki Kaisha, Tokyo, Japan

[21] Appl. No.: 824,987

[22] Filed: Feb. 3, 1986

Related U.S. Application Data

[63] Continuation of Ser. No. 628,788, Jul. 9, 1984, and a continuation of Ser. No. 632,927, Jul. 20, 1984.

[30] Foreign Application Priority Data

Jul. 22, 1983 [JP] Japan .................................. 58-134012
Jul. 22, 1983 [JP] Japan .................................. 58-134013

[51] Int. Cl.$^4$ .............................................. B66B 3/00
[52] U.S. Cl. ............................. 340/19 R; 340/815.31; 455/612
[58] Field of Search ............ 340/19 R, 20, 21, 815.31; 455/612

[56] References Cited

U.S. PATENT DOCUMENTS 4,577,177 3/1986 Marubashi ........................ 340/19 R

OTHER PUBLICATIONS

"Laser Scanning for Electronic Printing", Proceedings of IEEE, vol. 70, No. 6, Jun. 1982, pp. 597-618-Urbach, J. C.

Primary Examiner—James L. Rowland
Assistant Examiner—Jeffery A. Hofsass
Attorney, Agent, or Firm—Sughrue, Mion, Zinn, Macpeak and Seas

[57] ABSTRACT

An elevator display system employs an optical fiber 10 for transmitting power pulses and/or image display information between devices at an elevator boarding site and a control panel installed in a machine room via a modulated laser. At the boarding site the beam is deflected in an X, Y scanning mode and passed onto a half-mirror beam splitter 14. One portion exiting the mirror is directed to a viewing screen 6 to display the desired image, while another portion is converted to a power supply signal by an electrooptical transducer 15 for driving the display deflection circuits, thereby eliminating the need for electrical wiring between the control panel and the boarding site.

7 Claims, 6 Drawing Figures

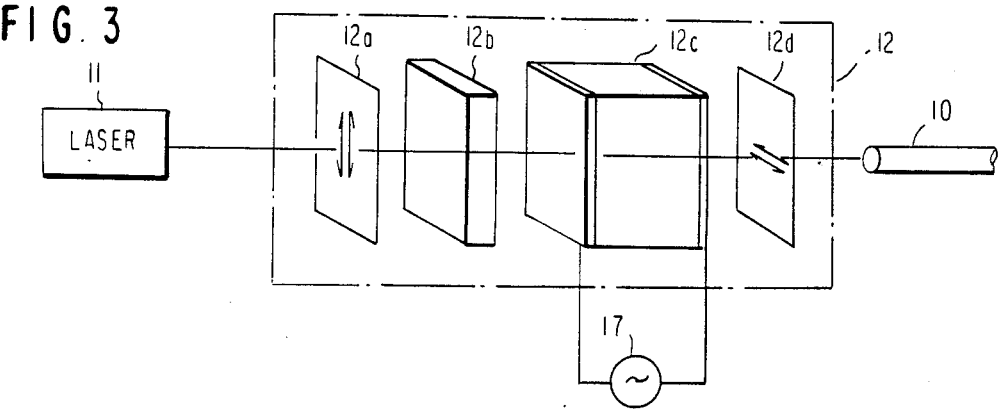
FIG. 3
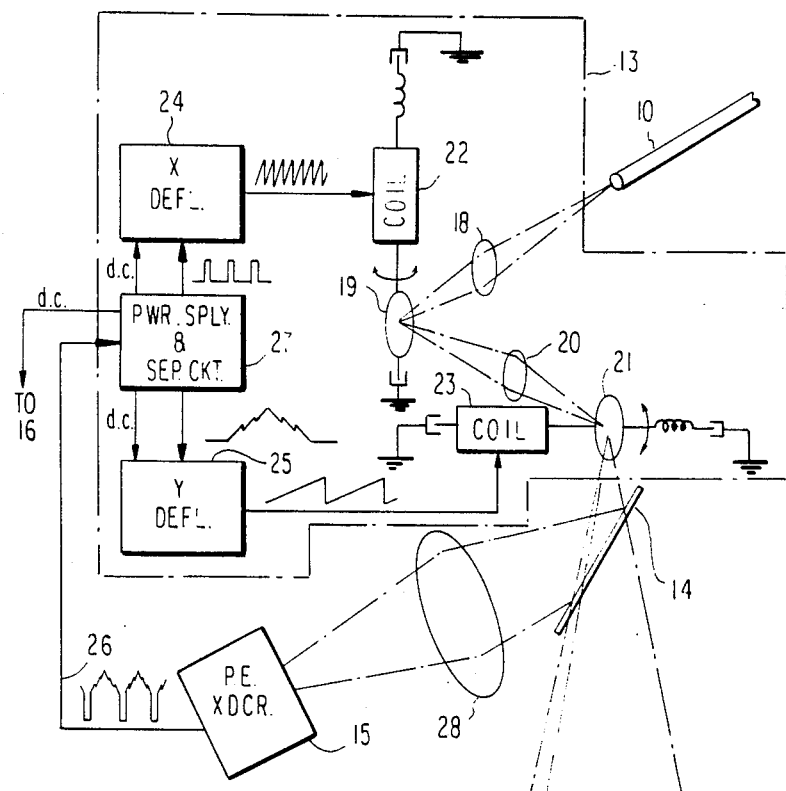
FIG. 4
FIG. 5
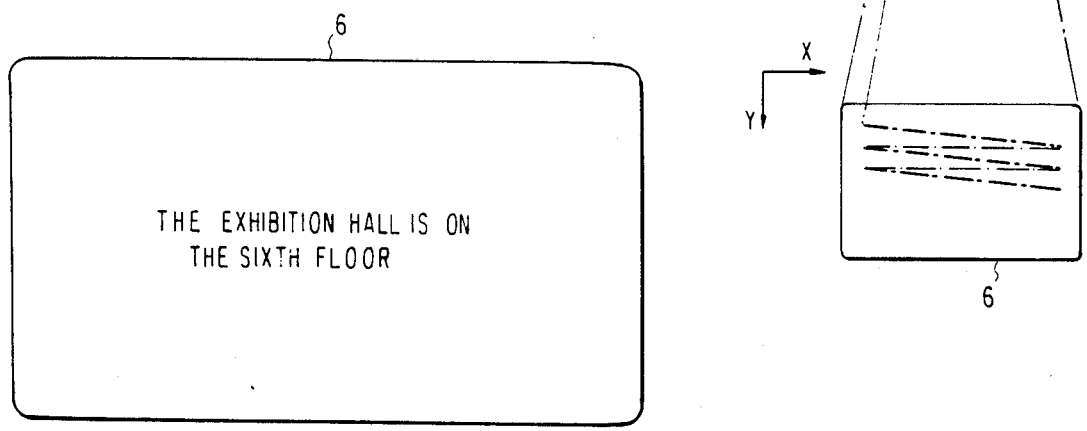
THE EXHIBITION HALL IS ON
THE SIXTH FLOOR

ELEVATOR DISPLAY SYSTEM WITH OPTICAL POWER TRANSMISSION

BACKGROUND OF THE INVENTION

This application is a continuation of application Ser. No. 628,788 filed July 9, 1984 and application Ser. No. 632,927 filed July 20, 1984.

The present invention relates to a display system for an elevator in which an optical fiber is employed for the transmission of both energy and information between display devices provided at each elevator boarding area and a control panel installed in a machine room.

Hitherto, when optical fibers are used to transmit information between elevator display devices and a machine room control panel, electrical power lines and signal lines must also be provided to drive electronic information processing circuits and devices at the elevator boarding area sites. In other words, wiring for the power supply source and the like is required in addition to the arrangement of the optical fibers. In consequence, the installation of the elevator display system is tedious, costly and error prone.

SUMMARY OF THE INVENTION

Accordingly, it is an object of the present invention to provide an elevator display system which makes it possible to eliminate the need for any electrical wiring between each elevator boarding area and the machine room, and in which only an optical fiber is employed for transmitting both energy and signal information between the boarding areas and the machine room.

To these ends, the light beam from a laser source in the machine room is optically modulated with display information and/or power level pulses and then transmitted through an optical fiber to an optical deflector at the elevator boarding area site. The deflector scans part of the beam across an image display screen much in the manner of a television raster scan, and another part of the beam, separated out by an optical splitter, is directed onto a photoelectric transducer which converts it into electrical power to drive the devices at the boarding site.

BRIEF DESCRIPTION OF THE DRAWINGS

FIG. 3 shows the arrangement of a practical example of an optical modulator in FIG. 2;

FIG. 4 shows the arrangement of a practical example of an optical deflector in FIG. 2;

FIG. 5 shows a practical example of the display on a screen; and

DETAILED DESCRIPTION OF THE PREFERRED EMBODIMENT

Figure 1:
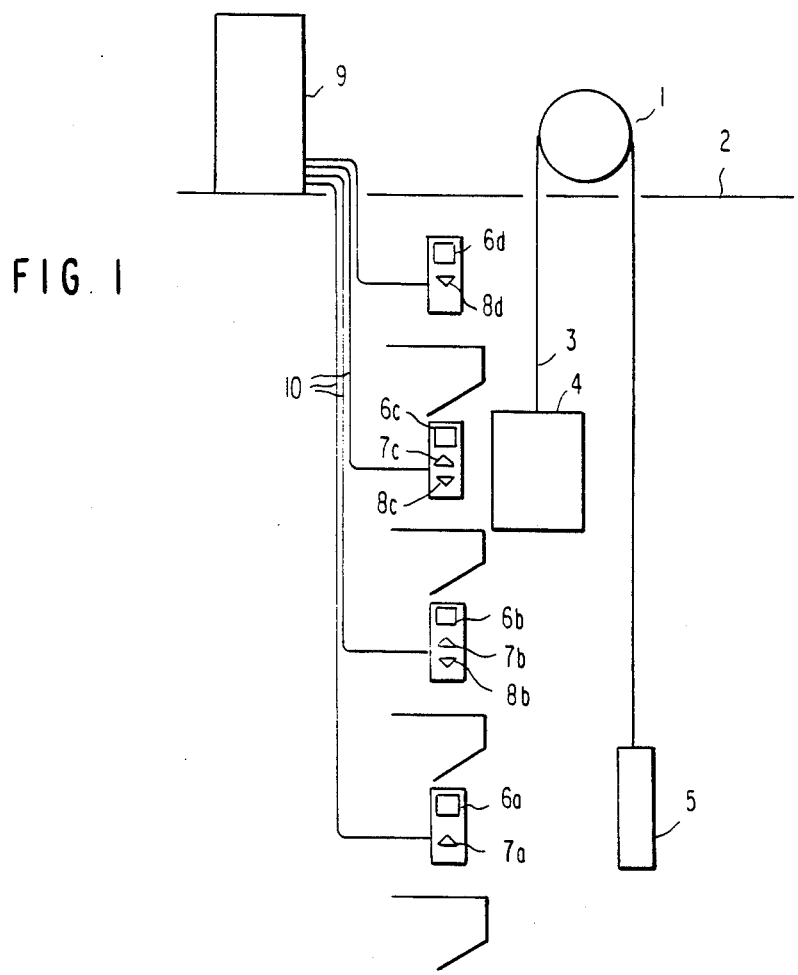
FIG. 1 is a schematic illustration of an elevator display system in accordance with the present invention.

In FIG. 1 a sheave 1 rotated by a hoisting machine (not shown) installed in a machine room 2 drives a cable 3 having a cage 4 joined to one end and a counterweight 5 joined to the other end. Reference numerals 6a to 6d denote screens provided at elevator boarding areas on first to fourth floors, respectively, for displaying comments for passengers waiting at the boarding areas. UP call buttons 7a to 7c are provided below the screens on the first to third floors, and DOWN call buttons 8b to 8d are provided below the screens on the second to fourth floors. Each of the display devices (the screens and the call buttons) is connected to a control panel 9 in the machine room through an optical fiber 10.

Figure 2:
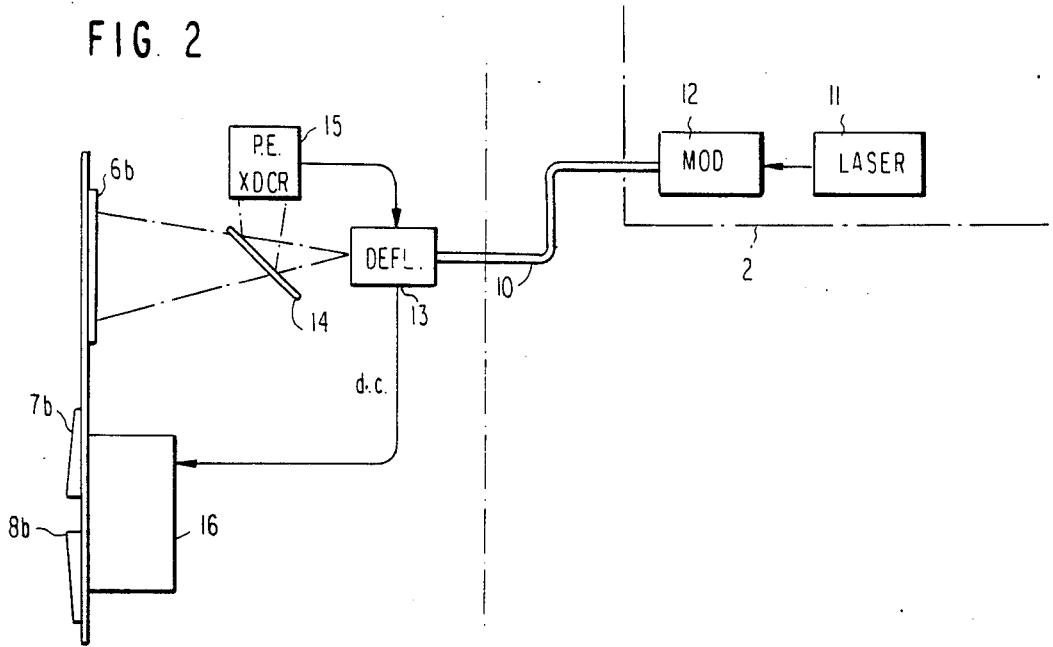
FIG. 2 is a block diagram showing the related arrangement of an optical transmission system and a display unit employed in the elevator display system.

FIG. 2 shows the relationship between the display devices at the elevator boarding area on the second floor, for example, and the control panel 9, wherein reference numeral 11 denotes a light source, such as a laser, while numeral 12 represents an optical modulator for modulating the light beam from the source 11 in accordance with display information. The modulated light beam is transmitted through the fiber 10 to an optical deflector 13 at the elevator boarding site. The deflector scans the transmitted light beam across the screen 6b via an optical splitter 14, such as a half-mirror. A photoelectric transducer 15, such as a solar cell, is mounted on the emergent side of the splitter 14 and supplies alternating electrical power to the deflector, which converts it into d.c. signal to drive its own internal circuitry and to illuminate the UP and DOWN call buttons 7b, 8b, as described in greater detail below. Call signals generated by pressing the buttons are transferred from a transistor switch interface unit 16 to the control panel 9 through an optical fiber, not shown.

FIG. 3 shows an electrooptical (E-O) Pockels cell modulator as a practical example of the optical modulator 12. The light emitted from the constant-output laser source 11 is linearly polarized by an analyzer plate 12a and then circularly polarized by a quarter-wave plate 12b of a natural double reflection material, e.g., rock crystal and mica. This circularly polarized light becomes elliptically polarized when passing through an electrooptical crystal ($Bi_{12}SiO_{20}$, for example) 12c having transparent electrodes on both end faces thereof connected across a modulating power source 17; the refractive indexes of the crystal in two orthogonal axes within a plane perpendicular to the direction of application of a voltage vary in accordance with such voltage. Accordingly, the light exiting through an analyzer plate 12d is modulated in intensity in accordance with the voltage applied to the electrooptical crystal 12c, and is applied to the optical fiber 10.

FIG. 4 shows a practical example of the optical deflector 13, which makes use of galvano-mirrors. The light transmitted through the optical fiber 10 is passed through a first condenser lens 18, reflected by a first galvano-mirror 19, passed through a second condenser lens 20, and reflected by a second galvano-mirror 21 onto the display screen 6.

The first mirror 19 is secured to a first coil 22 and mounted through a spring so as to be rotatable about one axis. The mirror is rotated through an angle proportional to a sawtooth current flowing through the coil to thus scan the light across the screen 6 in the X direction. Similarly, the second mirror 21 is secured to a second coil 23 and spring mounted for rotation about an axis perpendicular to that of the first mirror 19. The second mirror is rotated through an angle proportional to a shallow slope sawtooth current of relatively low frequency flowing through the second coil to thus scan the light across the screen 6 in the Y direction.

The currents flowing through the first and second coils 22, 23 are generated in deflection circuits 24, 25 similar to the horizontal and vertical deflection circuits employed in a television receiver.

A timing or synchronizing signal generated by the modulator 12 is embodied in the transducer output on line 26, which is fed to a power supply/separating circuit 27. The latter separates out the timing signal spikes or pulses from the composite input signal by thresholding, and converts the remainder into a d.c. power supply signal to drive the deflection circuits and the interface unit 16.

A condenser lens 28 is provided to focus the light reflected by the half-mirror beam splitter 14 onto the relatively small light-receiving window of the photoelectric transducer 15.

The above-described optical modulator 12 and optical deflector 13 are both known and disclosed in, for example, "PROCEEDINGS OF THE IEEE", Vol. 70, No. 6, June 1982, on pp. 602 and 604. The optical deflector described above is only intended to illustrate the principle of such deflection; a compact optical deflector making use of the acoustooptic effect may also be employed.

FIG. 5 shows a practical example of an information display on the screen 6. A notification that "The exhibition hall is on the sixth floor" would obviously be useful to guide attendees in a convention center or hotel. The screen 6 can thus function similar to a cathode-ray tube to display, for example, figure patterns and picture image information.

Figure 6:
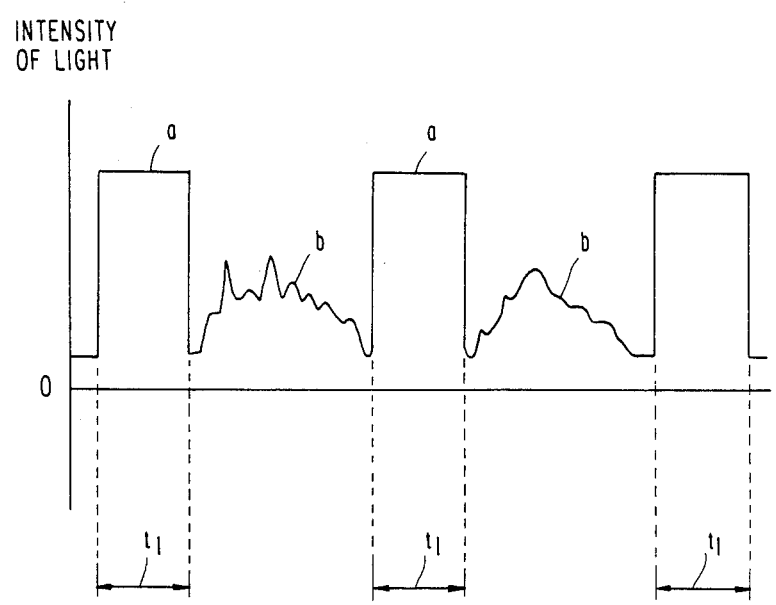
FIG. 6 shows a waveform diagram according to an alternate modulation scheme.

An alternate modulation scheme is illustrated by the waveform diagram of FIG. 6, wherein relatively high amplitude power level pulses a are interleaved with the display information signal b by the electrooptical crystal 12c during the blanking or flyback periods t1. A transduced waveform arrangement of this type provides increased electrical power, as represented by the area of the pulses a. Such a modulation technique is particularly useful in installations having enhanced power supply requirements, such as multiple elevator systems for office buildings and the like.

According to the elevator display system of the invention, a part of the display information modulated light beam transmitted from the control panel in the machine room to the devices at the elevator boarding sites through optical fibers is converted into electrical power to drive the devices. Therefore, it is unnecessary to provide conventional power source and signal transmission wiring between the machine room and the boarding areas. Since only optical fibers are employed for "wiring" between the boarding areas and the machine room the space requirements are reduced, and maintenance is facilitated. Moreover, since undesirable contact with other power source is reduced, the invention enables a broad-band signal transmission with excellent noise resistance.

What is claimed is:

1. A display system for an elevator, comprising:
   (a) a laser light source (11) disposed in an elevator machine room (2);
   (b) an optical modulator (12) disposed in the machine room for modulating a light beam from said source in accordance with image display information;
   (c) an optical fiber (10) for transmitting the light beam from said optical modulator to an elevator boarding area site;
   (d) an optical deflector (13) disposed at the boarding site for deflecting the display information modulated light beam transmitted through said optical fiber in a scanning mode;
   (e) an optical beam splitter (14) disposed in an output path of said optical deflector;
   (f) a photoelectric transducer (15) disposed to receive a portion of the light beam exiting said optical splitter for converting said portion into electrical power for said deflector and for devices at said boarding site; and
   (g) a viewing screen (6) disposed to receive another portion of the light beam exiting said optical splitter to display said image information.

2. A display system according to claim 1, wherein said optical modulator comprises an electrooptical Pockels cell.

3. A display system according to claim 1, wherein said optical deflector comprises an assembly of galvano-mirrors (19, 21) and condenser lenses (18, 20).

4. A display system according to claim 3, wherein said galvano-mirrors are secured to coils and mounted through springs so as to be rotatable about axes through angles proportional to current flowing through said coils.

5. A display system according to claim 1, wherein said photoelectric transducer comprises a solar cell.

6. A display system according to claim 1, wherein said optical modulator impresses a timing signal on said light beam, and said optical deflector includes means (27) for separating said timing signal from said transducer output and supplying it to X and Y deflection circuits (24, 25).

7. A display system according to claim 1, wherein said optical modulator impresses relatively high amplitude power level pulses (a) on said light beam, said pulses alternating with an image display signal.

* * * * *